United States Patent [19]

Heitmann

[11] 4,163,248

[45] Jul. 31, 1979

[54] FIELD SEQUENTIAL TRANSMISSION OF LUMINANCE AND CHROMINANCE INFORMATION

[75] Inventor: Jürgen Heitmann, Seeheim, Fed. Rep. of Germany

[73] Assignee: Robert Bosch GmbH, Stuttgart, Fed. Rep. of Germany

[21] Appl. No.: 839,111

[22] Filed: Oct. 3, 1977

[30] Foreign Application Priority Data

Oct. 4, 1976 [DE] Fed. Rep. of Germany ....... 2644706

[51] Int. Cl.² .......................... H04N 9/02; H04N 9/40
[52] U.S. Cl. ........................................ 358/12; 358/13; 358/14
[58] Field of Search ..................... 358/4, 11, 12, 13, 14

[56] References Cited
U.S. PATENT DOCUMENTS 3,255,303  6/1966  Kihara ..................................... 358/4

Primary Examiner—Robert L. Richardson
Attorney, Agent, or Firm—Michael J. Striker

[57] ABSTRACT

Color T.V. signal information is transmitted from a receiver into a recorder, from a transmitter to a receiver, from a color T.V. camera into a transmitter, or the like. The luminance component and the chrominance component are alternately applied to an analog-to-digital converter, during alternate respective field-periods (half-frame periods) of the T.V. signal. Produced at the output of the converter is a signal in which the digital chrominance information alternates with the digital luminance information during different respective field-periods of the T.V. signal. Although a single analog-to-digital converter can be used, the sampling frequency for the analog-to-digital conversion of the two different components can be of different respective values.

20 Claims, 1 Drawing Figure

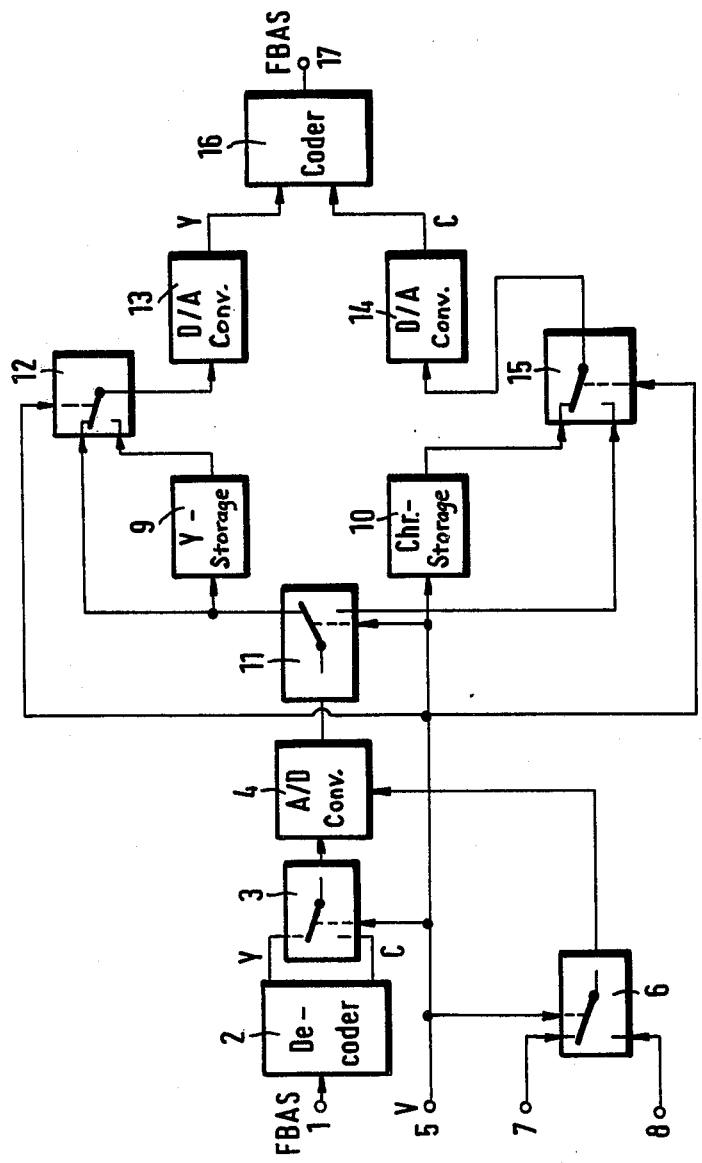

FIELD SEQUENTIAL TRANSMISSION OF LUMINANCE AND CHROMINANCE INFORMATION

BACKGROUND OF THE INVENTION

The invention concerns systems for the transmission and/or storage of color T.V. signals. The publication "NTZ," 1971, vol. 6, pp. 321–325 discloses a digital transmission technique for color T.V. signals. A distinction is drawn between closed and separate encoding, when characterizing what type of analog-to-digital conversion technique is to be utilized for the color T.V. signals to be transmitted. With so-called closed encoding, the complete analog composite color T.V. signal is sampled with respect to amplitude, quantized and pulse-code modulated. In the case of so-called separate encoding, the luminance and chrominance components of the color T.V. signals are separately subjected to analog-to-digital conversion. Separate encoding of color T.V. signals creates the possibility of reducing information redundancy much more effectively than is the case with closed encoding of color T.V. signals. One reason for this is that different sampling frequencies can be employed, one for one signal component and a different one for the other signal component. Another reason relates to the possibility of utilizing for the separately encoded components transmission techniques which are particularly well suited for the chrominance component, for example. However, although separate encoding makes possible a significant reduction in redundant information, it inherently tends to bring with it the disadvantage of increased cost for the means needed to separately process two signal components, i.e., instead of just a single signal.

SUMMARY OF THE INVENTION

It is a general object of the invention to provide a method and system for the transmission of separately encoded signal components of the type discussed above, but of such a design as to inherently exhibit important cost and circuitry savings relative to transmission-channel capacity and signal processing.

This general object, and others which will become more understandable from the following description of preferred embodiments, can be met, according to one advantageous concept of the invention, by transmitting (and/or storing) the luminance and chrominance components of the color T.V. signal alternately, during different respective field periods (half-frame periods).

This fieldwise (half-framewise) alternate transmission or storage of the chrominance and luminance information leads to information loss, of course, but this information loss is compensated for, during for example reproduction, by fieldwise repetition of the fieldwise multiplexed chrominance information during the field period associated with the luminance information and, likewise, by fieldwise repetition of the fieldwise multiplexed luminance information during the field period associated with the chrominance information. Preferably, during one half-frame period (field portion), the chrominance information is written-in into a storage and then, during the next half-frame period during which the chrominance information just mentioned is no longer present, the stored chrominance information is read out from the storage, in order to reconstitute a complete (full frame) image. The same applies to the luminance information.

Another advantage of the inventive concept is that is makes possible the use of a single analog-to-digital converter for the separate encoding of the luminance and chrominance information, thereby eliminating the need for a second costly and space-consuming analog-to-digital converter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE depicts an exemplary system for the separate encoding of the chrominance and luminance information in a color T.V signal and an exemplary system for the reconstitution of the color T.V. signal.

DESCRIPTION OF THE PREFERRED EMBODIMENTS

In the block circuit diagram depicted in the single FIGURE, the inventive concepts are explained with reference to a system incorporating a field (half-frame) digital storage. In order that the storage capacity of the digital half-frame storage be kept as low as possible, the complete composite color T.V. signal FBAS at terminal 1 is to be separately encoded, the concept of separate encoding and its advantages having been explained earlier. To this end, the complete color T.V. signal FBAS is applied to a decoder 2, which separates out from the T.V. signal the video-frequency signal components for luminance Y and chrominance C. The luminance signal component Y and the chrominance signal component C are alternately transmitted, via a controlled changeover switch 3, to an analog-to-digital converter 4.

The switch-control signal V which controls the setting of changeover switch 3 is applied at terminal 5, has a frequency corresponding to the vertical synch frequency of the T.V. signal, and is a square-wave signal. This switch-control signal V causes the luminance component Y to be transmitted to converter 4 during one field period (half-frame period), the chrominance component C to be transmitted to converter 4 during the next field period (half-frame period), and so forth.

The analog-to-digital converter 4 has a sampling-control input at which it receives sampling control signals via a changeover switch 6, from either a terminal 7 or a terminal 8. The repetition frequencies of the sampling-control pulses available at terminals 7 and 8 are different; i.e., the respective sampling rates for the analog-to-digital conversion of the chrominance and luminance signal components are different. In particular, during the analog-to-digital conversion of the luminance component Y, changeover switch 6 is in its illustrated setting, transmitting sampling control pulses from terminal 7 to the sampling-control input of converter 4 at a first repetition frequency. During the analog-to-digital conversion of the chrominance component C, changeover switch 6 is in its non-illustrated setting, transmitting sampling control pulses from terminal 8 to the sampling-control input of converter 4 at a different repetition frequency, establishing a different sampling rate for the analog-to-digital conversion of the chrominance component. The setting of changeover switch 6, likewise, is controlled by the switch-control signal V at terminal 5, already referred to.

The signal produced at the output of analog-to-digital converter 4 is transmitted and received by a changeover switch 11. Changeover switch 11, during alternate half-frame periods, routes the signal transmitted from converter 4 to a luminance storage 9, then to a chrominance storage 10, then again to luminance storage 9, and so forth. The change of setting of changeover switch 11 at the proper times is performed under the control of a switch-control signal just like the switch control signal V already referred to, and here shown as being transmitted from the terminal 5.

The signals present at the input and output of luminance storage 9 are transmitted, during alternate respective half-frame periods, via a controllable changeover switch 12, to a digital-to-analog converter 13. Likewise, the signals present at the input and output of chrominance storage 10 are transmitted, during alternate respective half-frame periods, via a controllable changeover switch 15, to a digital-to-analog converter 14. The changeover switches 12 and 15 are likewise controlled by a vertical-synch-frequency square-wave signal such as from terminal 5. The control of, for example, changeover switch 12 is performed such that, during one half-frame period, the luminance component transmitted from the output of switch 11 is transmitted via switch 12 to converter 13 and, simultaneously therewith, written-in into luminance storage 9; then, during the next half-frame period, the switch 12 is in its non-illustrated setting and the luminance information stored in the storage 9 during the previous half-frame period is now read out and transmitted to the digital-to-analog converter 13. The control of changeover switch 15 is performed analogously.

The digital-to-analog converter 13, 14 reconvert the digitalized luminance and chrominance information back into analog form. A conventional encoder 16 encodes the thusly produced video-frequency signal components Y and C to reconstitute a complete composite color T.V. signal FBAS, which is then available at output terminals 17.

The fieldwise (half-framewise) transmission of the individual signal components Y and C to separate respective storages makes it possible to eliminate one of the two analog-to-digital converters which would otherwise be required. Nevertheless, i.e., despite the use of a single analog-to-digital converter 4, the sampling of the chrominance and luminance information is performed with different respective sampling frequencies.

The chrominance signal component C available at the output of decoder 2, when registering a PAL, NTSC or SECAM color T.V. signal, can be alternately comprised of the sum (U+V) and the difference (U−V) of the color difference signals U and V, i.e., the sum and difference during alternate respective horizontal line periods of the television signal. It is also contemplated to alternately transmit, i.e., during alternate horizontal line periods, the color difference signals U and V themselves in the manner of a SECAM color T.V. signal.

In the embodiment depicted in the FIGURE, the signal to be transmitted, and comprised of separately coded luminance and chrominance components, is furnished at the output of analog-to-digital converter 4 and is transmitted to, and received by, changeover switch 11. I.e., the output of converter 4 is shown connected for signal transmission to changeover switch 11 by a simple electrical line. However, it will be understood that other transmitting-receiving situations could likewise be involved. For example, the output of converter 4 could be connected, through appropriate intermediate circuitry, to a broadcast transmitting antenna, with the input of changeover switch 11 being connected to the output of a receiving antenna. Alternatively, the output of converter 4 could be connected to the input of a recorder, which latter would be operative for recording the separately coded luminance and chrominance signal components. In that case, when the recorded signals are subsequently reproduced, they would be applied from the recorder to the input of changeover switch 11, and output terminal 17 could be connected to a broadcast transmitting antenna, to a studio monitor, or the like. In general, the concept of "transmission" as utilized in the claims presented hereinafter, is intended to be generic to transmission from a receiver into a recorder, from a transmitter to a receiver, from a color T.V. camera into a transmitter, from a color T.V. camera into a recorder, and the like.

It will be understood that each of the elements described above, or two or more together, may also find a useful application in other types of circuits and contexts differing from the types described above.

While the invention has been illustrated and described as embodied in a particular system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a method of transmitting a color T.V. signal from a receiver into a recorder, from a transmitter to a receiver, from a color T.V. camera into a transmitter, or the like, the step of transmitting the luminance component and the chrominance component of the color T.V. signal alternately and during different respective field-periods of the T.V. signal.

2. In a method as defined in claim 1, said step comprising transmitting the luminance component and the chrominance component in digital form, including applying the luminance component and the chrominance component to the input of an analog-to-digital converter alternately and during different respective field-periods of the T.V. signal and transmitting the output signal of the analog-to-digital converter.

3. In a method as defined in claim 2, the applying of the luminance component and the chrominance component alternately to the input of the analog-to-digital converter comprising doing so using a controllable changeover switch and applying to the changeover switch a square-wave switch-control signal whose frequency is so related to the the vertical synch frequency of the T.V. signal that the changeover switch changes setting once per field-period of the T.V. signal.

4. In a method as defined in claim 1, the transmitting of the chrominance component comprising transmitting chrominance-component information by alternately transmitting the sum and the difference of the two color-difference signal components of the T.V. signal during different respective horizontal line periods of the T.V. signal.

5. In a method as defined in claim 1, the transmitting of the chrominance component comprising transmitting the chrominance-component information by alternately transmitting the two color-difference signal components of the T.V. signal during different respective horizontal line periods of the T.V. signal.

6. In a method of processing color T.V. signal information transmitted from a receiver into a recorder from a transmitter to a receiver, from a color T.V. camera into a transmitter, or the like, wherein the luminance and chrominance components of the color T.V. signal are transmitted in digital form alternately and during different respective field-periods of the T.V. signal, the step of writing-in the luminance component into a luminance-component storage during alternate field-periods of the T.V. signal, and the step of writing-in the chrominance component into a chrominance-component storage during alternate field-periods of the T.V. signal, the chrominance-component write-in field-periods alternating with the luminance-component write-in field-periods.

7. In a method as defined in claim 6, the writing-in of the luminance and chrominance components into the luminance- and chrominance-component storages being performed using a changeover switch, including applying to the changeover switch a square-wave switch-control signal having a frequency so related to the vertical synch frequency of the T.V. signal that the changeover switch changes setting once per field-period of the T.V. signal.

8. In a system for transmitting a color T.V. signal from a receiver into a recorder, from a transmitter to a receiver, from a color T.V. camera into a transmitter, or the like, means for transmitting the luminance component and the chrominance component of the color T.V. signal alternately and during different respective field-periods of the T.V. signal.

9. In a system as defined in claim 8, the transmitting means including analog-to-digital converter means, means for applying the luminance component and the chrominance component to the input of the analog-to-digital converter means alternately and during different respective field-periods of the T.V. signal, and means for transmitting the output signal of the analog-to-digital converter means.

10. In a system as defined in claim 9, the means for applying including a controllable changeover switch controllable for alternatively transmitting the luminance and chrominance components and means for applying to the changeover switch a square-wave switch-control signal whose frequency is so related to the vertical synch frequency of the T.V. signal that the changeover switch changes setting once per field-period of the T.V. signal.

11. In a system for processing color T.V. signal information transmitted from a receiver into a recorder, from a transmitter to a receiver, from a color T.V. camera into a transmitter, or the like, wherein the luminance and chrominance components of the color T.V. signal are transmitted in digital form alternately and during different respective field-periods of the T.V. signal, a luminance-component storage; a chrominance-component storage and the luminance component into the luminance-component storage during alternate respective field-periods of the T.V. signal.

12. In a system as defined in claim 11, the means for writing-in including a controllable changeover switch controllable for receiving the digital luminance and chrominance components and routing the same to one or the other of the storages and means for applying to the controllable changeover switch a square-wave switch-control signal having a frequency so related to the vertical synch frequency of the T.V. signal that the changeover switch changes setting once per field-period of the T.V. signal.

13. In a method of storing a color T.V. signal, the step of transmitting to a storage the luminance component and the chrominance component of the color T.V. signal alternately and during different respective field-periods of the T.V. signal.

14. In a method as defined in claim 13, said step comprising transmitting the luminance component and the chrominance component to the storage in digital form, including applying the luminance component and the chrominance component to the input of an analog-to-digital converter alternately and during different respective field-periods of the T.V. signal and transmitting the output signal of the analog-to-digital converter to the storage.

15. In a method as defined in claim 14, the applying of the luminance component and the chrominance component alternately to the input of the analog-to-digital converter comprising doing so using a controllable changeover switch and applying to the changeover switch a square-wave switch-control signal whose frequency is so related to the vertical synch frequency of the T.V. signal that the changeover switch changes setting one per field-period of the T.V. signal.

16. In a method as defined in claim 13, the transmitting of the chrominance component to the storage comprising transmitting chrominance-component information to the storage by alternately transmitting to the storage the sum and the difference of the two color-difference signal components of the T.V. signal during different respective horizontal line periods of the T.V. signal.

17. In a method as defined in claim 13, the transmitting of the chrominance component to the storage comprising transmitting the chrominance-component information to the storage by alternately transmitting to the storage the two color-difference signal components of the T.V. signal during difference respective horizontal line periods of the T.V. signal.

18. In system for storing a color T.V. signal, storage means, and means for transmitting the luminance component and the chrominance component of the color T.V. signal to the storage means alternately and during different respective field-periods of the T.V. signal.

19. In a system as defined in claim 18, the transmitting means including analog-to-digital converter means, means for applying the luminance component and the chrominance component to the input of the analog-to-digital converter means alternately and during different respective field-periods of the T.V. signal, and means for transmitting the output signal of the analog-to-digital converter means to the storage means.

20. In a system as defined in claim 19, the means for applying including a controllable changeover switch controllable for alternatively transmitting the luminance and chrominance components and means for applying to the changeover switch a square-wave switch-control signal whose frequency is so related to the vertical synch frequency of the T.V. signal that the changeover switch changes setting once per field-period of the T.V. signal.

* * * * *